No. 692,962. Patented Feb. 11, 1902.
W. O. WORTH & W. R. DONALDSON.
COOLING OR CONDENSING COIL.
(Application filed Nov. 6, 1899.)
(No Model.)
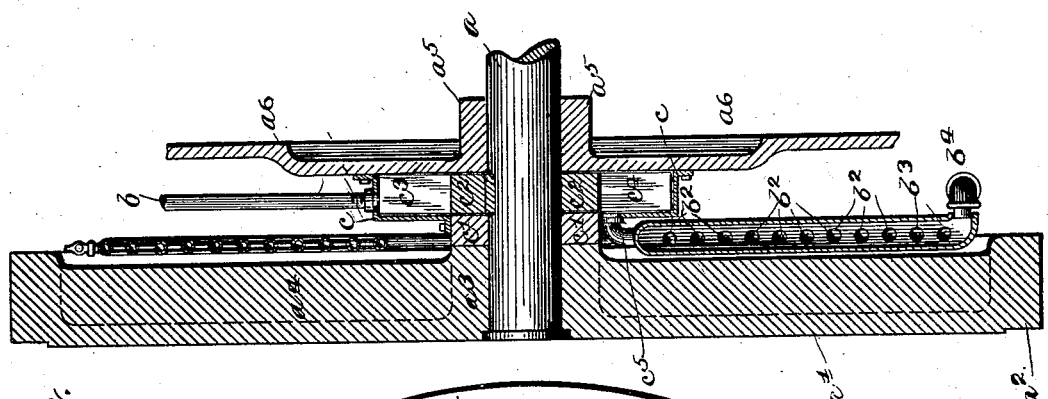
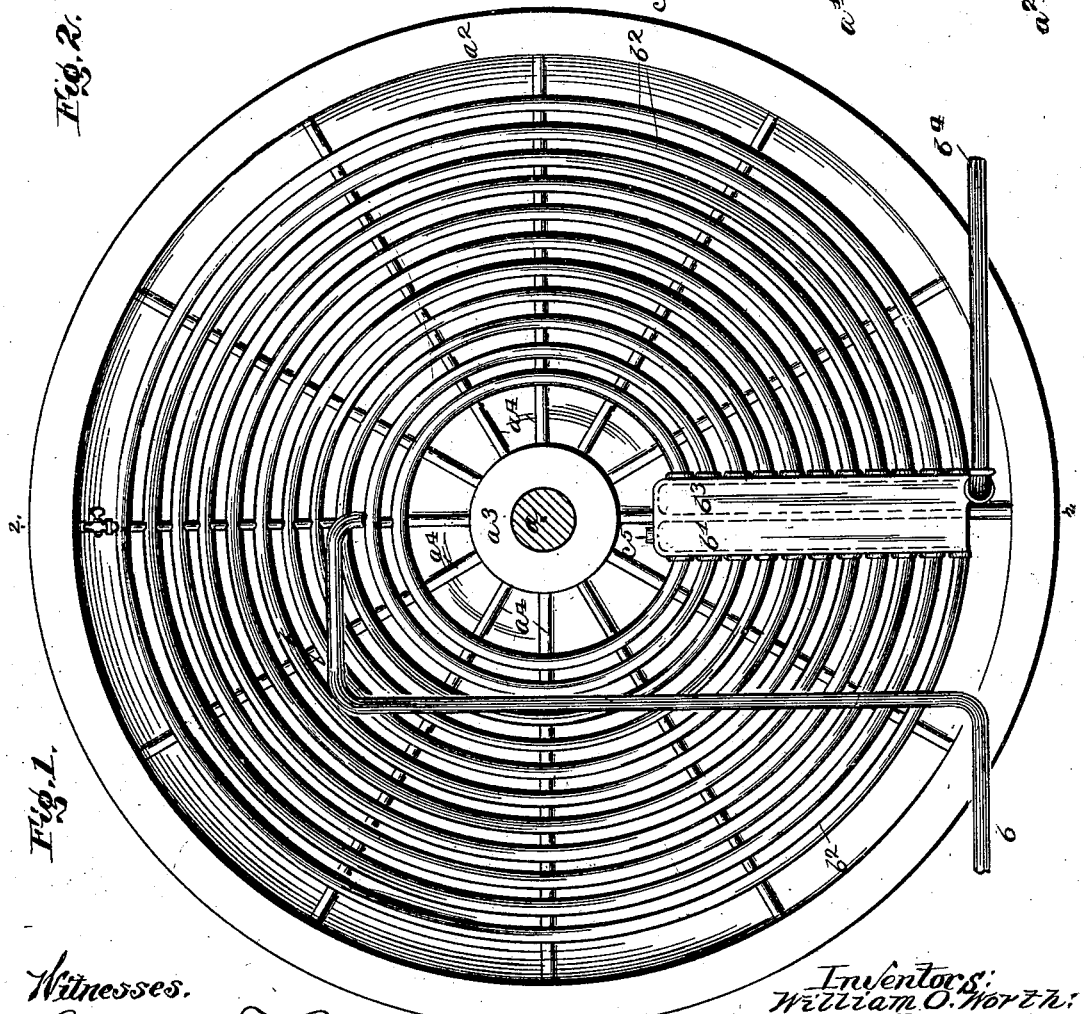
Witnesses.
Gustav F. Bauer
R. White
Inventors:
William O. Worth;
William R. Donaldson,
By Toré Bain
His Attorney.

UNITED STATES PATENT OFFICE.

WILLIAM O. WORTH AND WILLIAM R. DONALDSON, OF CHICAGO, ILLINOIS, ASSIGNORS OF ONE-THIRD TO HENRY W. KELLOGG, OF BATTLECREEK, MICHIGAN.

COOLING OR CONDENSING COIL.

SPECIFICATION forming part of Letters Patent No. 692,962, dated February 11, 1902.

Application filed November 6, 1899. Serial No. 735,962. (No model.)

*To all whom it may concern:*

Be it known that we, WILLIAM O. WORTH and WILLIAM R. DONALDSON, residing in Chicago, county of Cook, and State of Illinois, have invented certain new and useful Improvements in Cooling or Condensing Coils; and we do hereby declare the following to be a full, clear, and exact description of the invention, such as will enable persons who are skilled in the art to which it appertains to make and use the same.

Our invention has reference to improvements in cooling or condensing coils. It relates more particularly to coils that may form part of a water-circulating system adapted to be used in connection with gas or oil engines for the purpose of carrying away and dissipating the waste heat evolved from the combustion of the charge which would otherwise heat the cylinder of the said engine to a dangerous degree.

The object of our invention is to provide a means whereby the water which is used to carry away the excessive heat from the cylinder of a gas-engine and which is caused to circulate around the cylinder of such an engine for that purpose may be maintained at a lower temperature than would otherwise obtain if confined only within the system usually used for that purpose.

Our invention is especially applicable for use in connection with gas or oil engines when such engines are employed to propel motor-vehicles. For such use it is highly desirable to reduce the quantity of water necessary for this purpose to the minimum; but a sufficient quantity must be carried, so that the water used will be enough to part with most of the absorbed heat in its path of circulation; otherwise the water would be converted into steam, and thus escape.

To reduce the quantity of water to a minimum and at the same time to maintain it at a low temperature is the object of our invention.

In the accompanying drawings, Figure 1 is an elevation of our circulating-coil, which is placed in close relation with the revolving fly-wheel of a gas-engine. Fig. 2 is a section through line 2 2 of Fig. 1.

The letters of reference that denote similar parts are the same in both views.

The revolving shaft of an engine is designated by letter $a$. A fly-wheel $a'$ is fixed to the said shaft. $a^2$ is the rim of said fly-wheel. $a^3$ is the hub of said fly-wheel. $a^4$ represents radial ribs cast in said wheel between the hub $a^3$ and the rim $a^2$. The shaft $a$ revolves within a stationary journal-bearing $a^5$, a disk $a^6$ being an integral part thereof.

A casing $c$ is a portion of a rotary pump. It is attached to the stationary disk $a^6$ and to a washer $c'$, which surrounds the shaft $a$. A hub $c^2$ is keyed to the shaft $a$ and is provided with radial wings $c^3 c^4$, which form the rotating members of the pump. An intake-pipe $c^5$ connects the header $b'$ and the case $c$ at a point in the latter near its short diameter. Discharge-pipe $b$ communicates with the case $c$ at its largest diameter. Curved pipes $b^2$ are connected to the header $b'$ and also the header $b^3$. To the latter the pipe $b^4$ is connected. The pipe $b$, pump $c$, pipes $b^2$, pipes $b^4 c^5$, and headers $b'$ and $b^3$ form a part of a circulating system containing a reservoir and gas-engine cylinder-jacket.

It will of course appear evident that the pipes $b^2$ need not necessarily be arranged just as shown. They may be placed in any convenient manner so they occupy a plane practically parallel with the face of the revolving wheel $a'$.

The use and operation of our invention are as follows: The pipes, as shown, comprise a path for the circulation of the cooling-water of a gas-engine. The pipe $b$ may be connected to the top of the jacket of such an engine, and the pipe $b^4$ should be connected to the water-reservoir near the bottom. Another pipe should connect the top of the reservoir with the lower portion of the said water-jacket. Such an arrangement of connecting the reservoir and engine-jacket is well understood by those skilled in the art. As the water becomes heated in the water-jacket it will flow into the coil-pipes $b^2$ through the header $b'$ and pipe $b$. The pump $c$, associated with the shaft $a$, may be used to produce a forced circulation of the fluid within the coils $b^2$ and the system of which they are a part when the various devices are so placed as to preclude a natural circulation. When the wheel $a'$ is driven at its normal speed, the ribs $a^4$ will beat the air and cause a circulation of air around the coils $b^2$. Such a circulation is induced by the difference in the velocity of air confined between the ribs. The air travels faster at the longer than at the shorter radius, and thus a circulation is produced as it is forced out at the longer radius in an obliquely radial direction, which causes other air to enter at points of shorter radii than those where it is forced out, or, in other words, a circulation of air is induced in virtue of the difference of velocity of air confined between the ribs $a^4$ of the wheel $a'$, and the air that circulates in the manner described comes in contact with the pipes $b^2$ and carries the heat that is imparted to said coils by the circulating water contained therein away at the points of its highest velocity or near the rim of the wheel. The effect of the air circulation described is to lower the temperature of the fluid within the coils by carrying away a part of the heat with the agitated air.

Our coil may be used in connection with a steam-engine, and the exhaust-steam from said engine may be passed through said coil, and thereby condensed by lowering its temperature in the manner described before ejecting said steam into the atmosphere.

Having described our invention, what we claim as new, and desire to secure by Letters Patent of the United States, is—

The combination of a rotating wheel, projections, wings or ribs on said wheel adapted to agitate the air when said wheel is in motion, a series of pipes arranged proximate to the face of said wheel and within the path of air so agitated, an entrance-header and an exit-header common to all the pipes, and a pump for forcing the circulation of a fluid through said pipes, substantially as set forth.

In testimony whereof we have signed this specification, in the presence of two subscribing witnesses, this 1st day of November, 1889.

WILLIAM O. WORTH.
WILLIAM R. DONALDSON.

Witnesses:
M. F. ALLEN,
LOUIS G. SMITH.